TRUTH TABLE

| S | OUTPUT |
|---|---|
| 0 | $f_0$ |
| 1 | $f_1$ |
| 2 | $f_2$ |

INVENTOR
MIDHAT J. GAZALE

BY Alvin J. Riddles
ATTORNEY

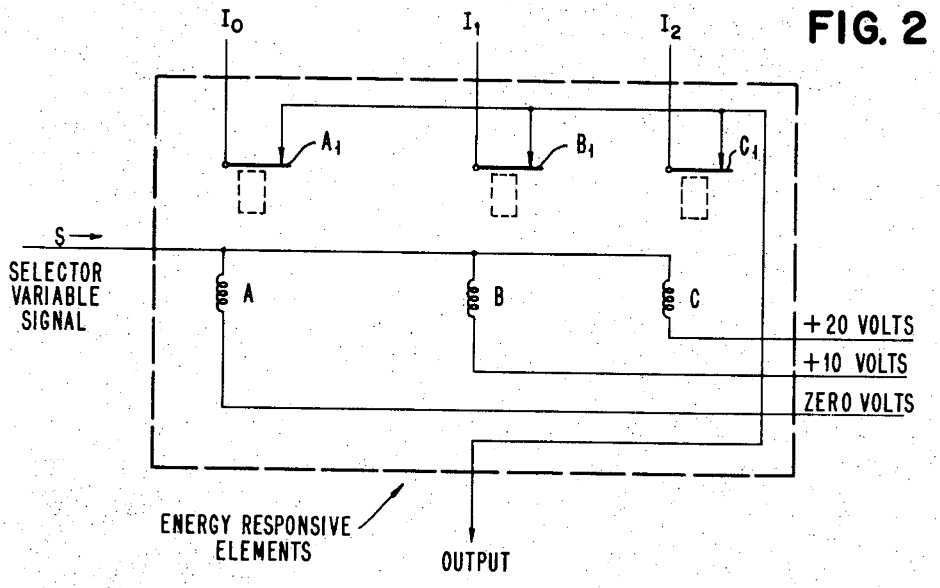
FIG. 2
| S (VOLTS) | RELAYS ENERGIZED | OUTPUT |
|---|---|---|
| ZERO | B AND C | $I_0$ |
| 10 | A AND C | $I_1$ |
| 20 | A AND B | $I_2$ |
FIG. 2A
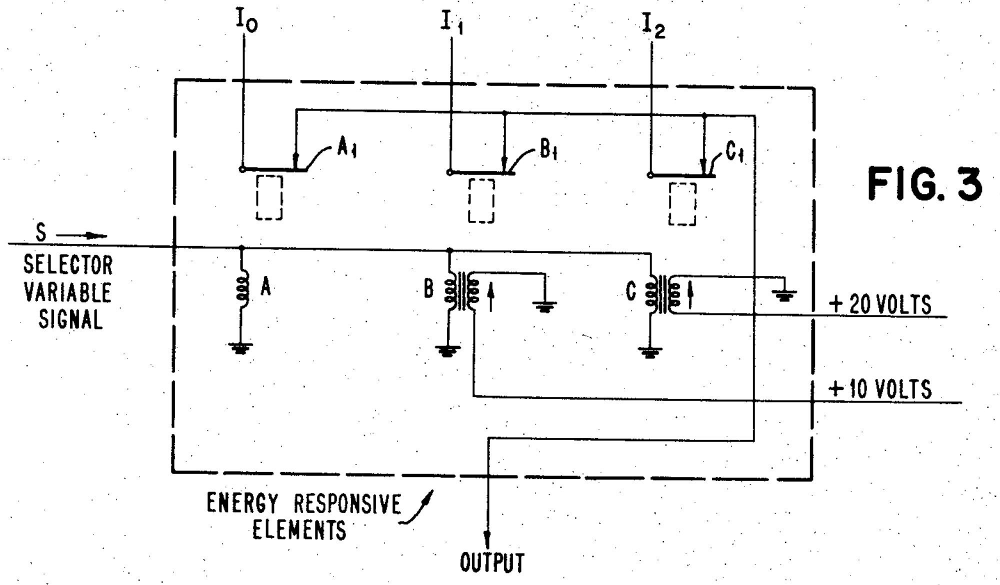
FIG. 3

| S | $C_0$ | $D_0$ | $C_1$ | $D_1$ | $C_2$ | $D_2$ |
|---|---|---|---|---|---|---|
| 0 | R | S | S | R | S | R |
| 1 | S | R | R | S | S | R |
| 2 | S | R | S | R | R | S |

$A_0 = D_0$
$A_1 = D_1$
$A_2 = D_2$ $B_0 = C_0$
$B_1 = C_1$
$B_2 = C_2$

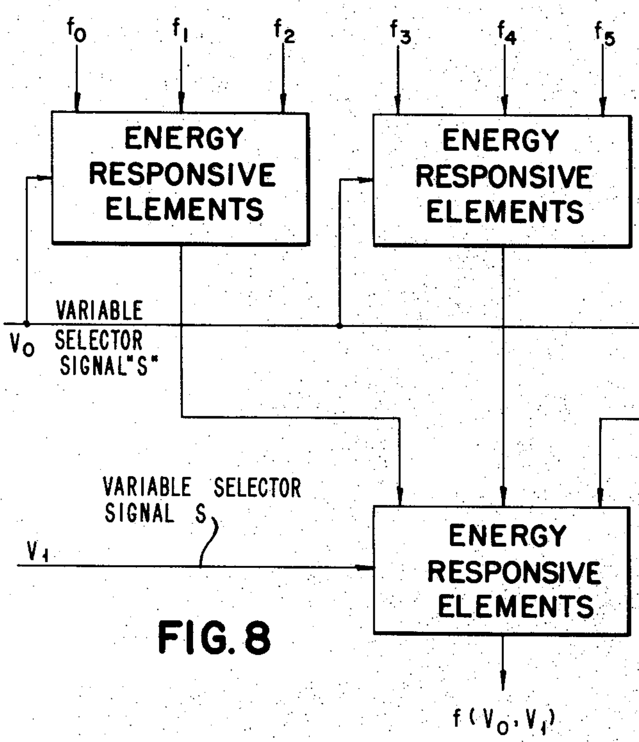
FIG. 8
| $V_1$ | $V_0$ | $f(V_0, V_1)$ |
|---|---|---|
| 0 | 0 | $f_0$ |
| 0 | 1 | $f_1$ |
| 0 | 2 | $f_2$ |
| 1 | 0 | $f_3$ |
| 1 | 1 | $f_4$ |
| 1 | 2 | $f_5$ |
| 2 | 0 | $f_6$ |
| 2 | 1 | $f_7$ |
| 2 | 2 | $f_8$ |
FIG. 8A
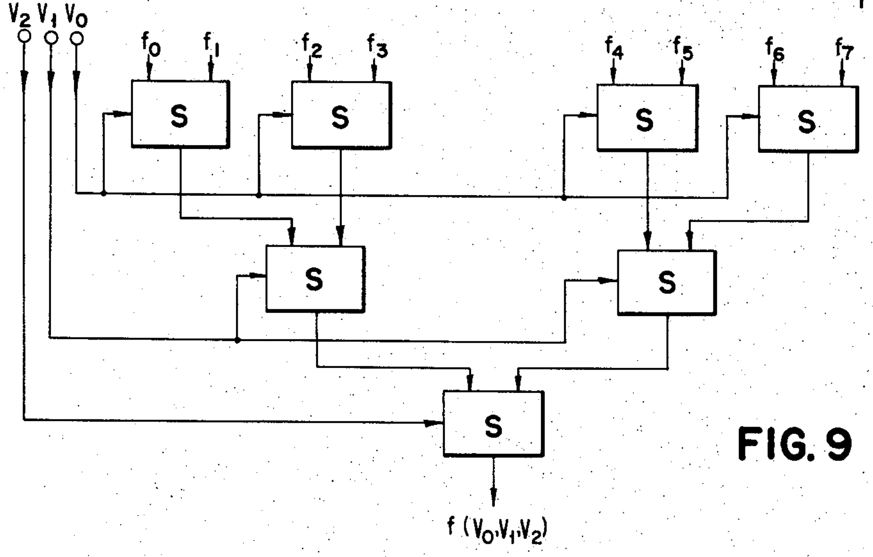
FIG. 9

3,142,037
Patented July 21, 1964

3,142,037

MULTIVALUED LOGIC ELEMENT

Midhat J. Gazale, Champrosay par Draveil, France, assignor to International Business Machines Corporation, New York, N.Y., a corporation of New York Filed Sept. 22, 1959, Ser. No. 841,527
6 Claims. (Cl. 340—172)

This invention relates to multivalued logic and more particularly to a logical element capable of generating from a plurality of multivalued information input signals a single output whose value is independent of the value of any of the input signals.

In the past, the Boolean Algebra System has been adapted for the analysis and synthesis of logical switching systems. This field of mathematics constitutes a remarkable application of methods of formalized logic in the domain of two-valued variables. However, two-valued switching systems can be regarded only as a particular case of the more general domain of several valued variables, and to functions of these variables.

What is described herein is an element which is capable of establishing in a single logical comparison a logical relationship between a plurality of multivalued input information channels and at least one output information channel which is independent of the particular input value. To accomplish this result there is provided according to the present invention a plurality of energy responsive elements for each of the input information channels. Each of the energy responsive elements are made responsive to a particular quantity of energy different from that required for any other such element. The variable energy selection signal acts simultaneously upon each energy responsive element to impress a given amount of energy on said element thereby selecting one of the information input channels.

Several embodiments are illustrated by means of which the energy response elements may be actuated in response to energy impressed thereon to funnel the selected input information channel to the output information channel. One such embodiment shown herein utilizes relay coils as the energy responsive element. The coils of said element are biased at particular energy levels from an external source. The relay points connect the output channel to the input channels. When a variable signal of sufficient magnitude to offset the biasing potential at a given energy responsive element is applied, the relay points of said element remain open and an output signal is received at the output information channel characteristic of the value of the information input signal associated with that particular energy responsive element. The variable signal, thereupon, "selects" which of the multivalued inputs will appear as the output and is known, therefore, as the "selector variable signal."

Other energy responsive elements shown herein are polarizing relay coils and cryotrons.

The device of the present invention is capable of generating on a single output line, a multivalued signal made up of the addition of signals from a plurality of channels in response to a single multivalued selector signal. Since the value of the output depends upon the value of the selector signal only, the variable inputs may assume not only the binary values of present and absent but also of an infinite number of intermediate states.

The device described herein finds wide utility in computer circuitry as for example, in computer automation of industrial processes. Original process information in such a system is received in the form of a continuum, such as variations in temperature, pressure, shaft rotation, lever motion, concentration of reactants, etc. In order to handle this information conveniently, it is desirable to digitize such information and carry out the computing problems in a discrete unit system, and thereafter, if required by the application, to retranslate the solution into analog presentation. The selector function device shown herein finds particular usefulness in accomplishing these objectives in that it can accept many valued information and convert the information into the form required for the digital computer. The device shown herein also finds further application in computing systems having a radix higher than the binary two.

An object of the present invention is to provide a logical element capable of establishing in a single logical comparison, a logical relationship between a plurality of multivalued input information channels and at least one output information channel.

A further object is to provide a multivalued logical element capable of generating from a plurality of multivalued information input signals a single output having a value which is independent of the value of any of the input signals.

Still another object is to construct logic apparatus capable of establishing a relationship between a plurality of input information channels and at least one energy responsive element for each channel of said plurality of input information channels, each of said energy responsive elements being responsive to a particular quantity of energy different from the quantity of energy required for response for each energy responsive element, including means associated with each said energy responsive element coupling each said input information channel to said at least one output information channel, said apparatus including other means actuating said coupling means for each energy responsive element in response to the presence of energy at said energy responsive element and means impressing a variable energy selection signal in common simultaneously on each energy responsive element.

A more specific object is to provide a logical element capable of establishing a logical relationship between a plurality of multivalued input information channels and at least one output information channel, said apparatus comprising a plurality of relay energy responsive elements being responsive to a particular quantity of energy different from the quantity of energy required for response for each other energy responsive element, relay point means associated with each of said energy responsive element coupling each said input information channel to said at least one output information channel, relay coil means biased at a predetermined voltage actuating said relay point coupling means in response to the presence of energy at said energy responsive element, and a selector signal impressing a predetermined variable energy selection signal in common simultaneously on each energy responsive element.

Yet another object of the present invention is to provide a polarizing relay embodiment of the present invention wherein the energy responsive element is provided with polarizing coils which may be biased from an external source by an applied voltage.

Another object is to provide a cryogenic multivalued logic circuit of the type described herein.

Another specific object is to provide a cryogenic embodiment of the present invention having at least one superconductor gate conductor for each of said input information channels coupling said input channels to said output channel and normally maintained in a superconductive state in the absence of magnetic fields applied thereto and having biased control conductors for at least one of said gate conductors to apply a different bias to each to maintain at least one of the gates in a normal state and variable selector signals operable to apply signals in common simultaneously on said first control conductor in opposition of said bias to select a given input.

Still another object is to provide a superconductive selector circuit of the type described in the above object herein having an alternate path provided therein for dissipating unselected input signals.

Among the other objects is to provide a circuit capable of selecting a given input from a plurality of multivalued input signals utilizing a plurality of variable selector signal lines the product of the number of signals times the values which each of said signals may assume being less than the total number of inputs into said system.

The foregoing and other objects, features and advantages of the invention will be apparent from the following more particular description of preferred embodiments of the invention, as illustrated in the accompanying drawings.

In the drawings:

FIGURE 2 is a relay embodiment of the logic element of the present invention.

FIGURE 2A is a "truth table" similar to the one shown in FIGURE 1A for said relay embodiment.

FIGURE 3 illustrates an embodiment of the present invention having polarizing relays as the energy responsive element.

FIGURE 8 shows a schematic representation of a cascaded assemblage of multivalued logic elements.

FIGURE 8A is still another "truth table" showing the operation of the cascaded circuit of FIGURE 8.

FIGURE 9 shows a schematic representation of another cascaded assemblage of multivalued logic elements.

According to the instant invention a multivalued logic element is provided which comprises a plurality of multivalued selected inputs, a single selector variable input, a single output channel and a plurality of energy responsive elements. The selector variable input functions as a connective to couple the selected input variables to the output channel. In this device the value which the selector variable input signal assumes determines which, if any, of the selected input variables will appear on the output line.

Figures 1, 1A:
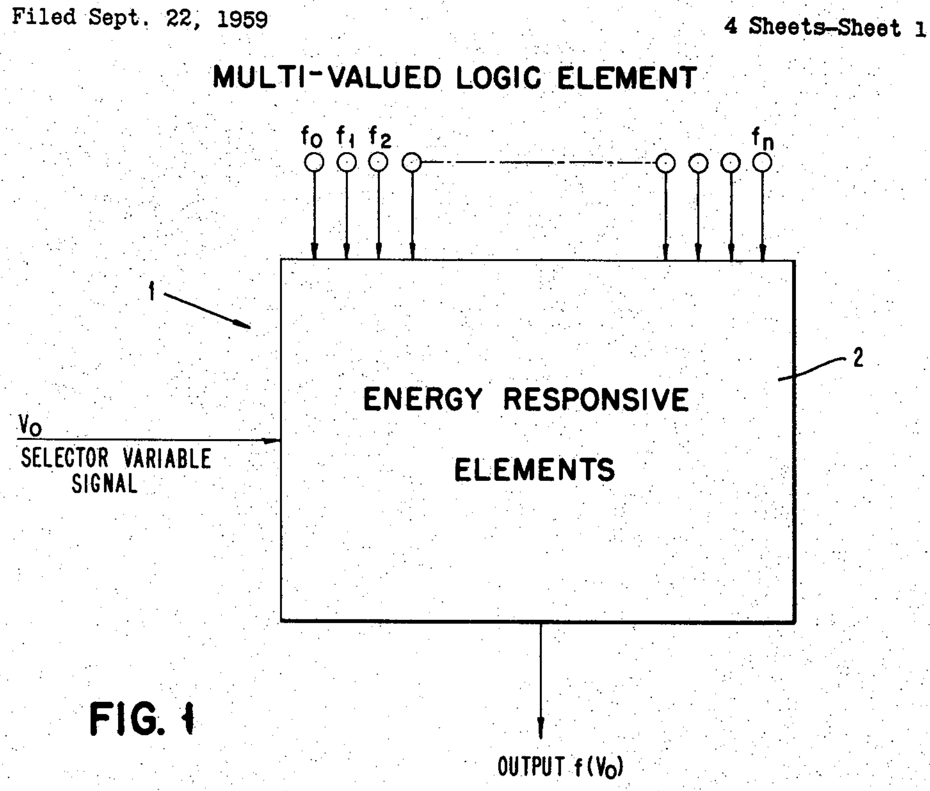
FIGURE 1 shows a schematic representation of the multivalued logic element of the present invention.
FIGURE 1A is a "truth table" showing the operation of the element of FIGURE 1.

Referring now to FIGURE 1 there is shown in generalized terms the multivalued logic device 1 of the present invention. The element comprises a plurality of energy responsive elements 2 into which is fed a plurality of multivalued input signals $f_0, f_1 \ldots f_n$ constituting the information input channels. An output information channel $f(V_0)$ is also provided. The selector variable signal, $V_0$ operates on the energy responsive elements to select a given input signal in accordance with signal applied thereto.

The operation of the logic element described above is tabulated in the truth table of FIGURE 1A. Assume, for example, that three inputs $f_0$, $f_1$ and $f_2$ are present. These inputs may assume, not merely the binary conditions of present or absent, but an infinite number of different values. Any one of these inputs can be connected to the output depending upon the value of the selector variable signal that is applied to its corresponding energy responsive element. For example, if the selector signal is absent, only the input $f_0$ will be selected as the output; this selection, furthermore, is independent of the particular value of $f_0$. When the variable signal has a different predetermined value corresponding to $f_1$, energization of the energy element responsive only to the value of $f_1$ will permit $f_1$ only to appear as the output. Likewise when the variable signal has a value corresponding to $f_2$, only $f_2$ will be generated on the output line. The element therefore produces on a single output line a multivalued signal which constitutes an addition of a plurality of information input signals applied to energy responsive elements in response to a single multivalued selector signal. Furthermore, the output depends on the value of the selector signal only; therefore the inputs may assume any number of intermediate states without affecting the operation of the device.

In FIGURE 2 there is shown a circuit which embodies the principles of the present invention in a physical structure. The "selector variable signal" line is shown connected to three relay coils, A, B and C. The other sides of the coils are connected to external voltage sources which bias the coils at 0, +10, and +20 volts respectively. The normally closed relay points $A_1$, $B_1$ and $C_1$ connect the single output line to the multivalued inputs $I_0$, $I_1$ and $I_2$, respectively. The "selector variable signal" S is permitted to assume one of three values, for example 0, 10 or 20 volts. In operation, relay A, B or C will pick up on either 10 or 20 volts, but not on zero volts. When the value of the "selector variable signal" is zero volts, both relays B and C will pick up, opening relay points $B_1$ and $C_1$. Relay point $A_1$, meanwhile, will remain closed, thus connecting input $I_0$ to the output. Likewise, when the value of the "signal S" is 10 volts, relays A and C will pick up, opening points $A_1$ and $C_1$ while $B_1$ remains closed. Thus $I_1$ will connect to the output. Similarly, when S is 20 volts, relays A and B will pick up, opening points $A_1$ and $B_1$, while $C_1$ will remain closed. Thereby only $I_2$ will connect to the output. The truth table of FIGURE 2A summarizes these successive operations.

An alternate method of operating the relays is shown in FIGURE 3. Here only relays B and C are provided with polarizing coils. B is polarized at 10 volts in the direction shown by the arrow and C at 20 volts in a similar direction. The relays are constructed so that they will pick up when 10 volts is applied to either of the coils. Therefore, application of a "selector variable signal" of zero volts will result in only B and C picking up, generating $I_0$ thereby as the output. A signal of 10 volts on the other hand will result in A and C picking up, coupling only $I_1$ to the output line, since the opposing voltages applied to the coils of relay B cancel out. Similarly a signal of 20 volts will result in A and B picking up giving $I_2$ as the sole output.

Figures 4, 4A, 5, 5A, 6, 7:
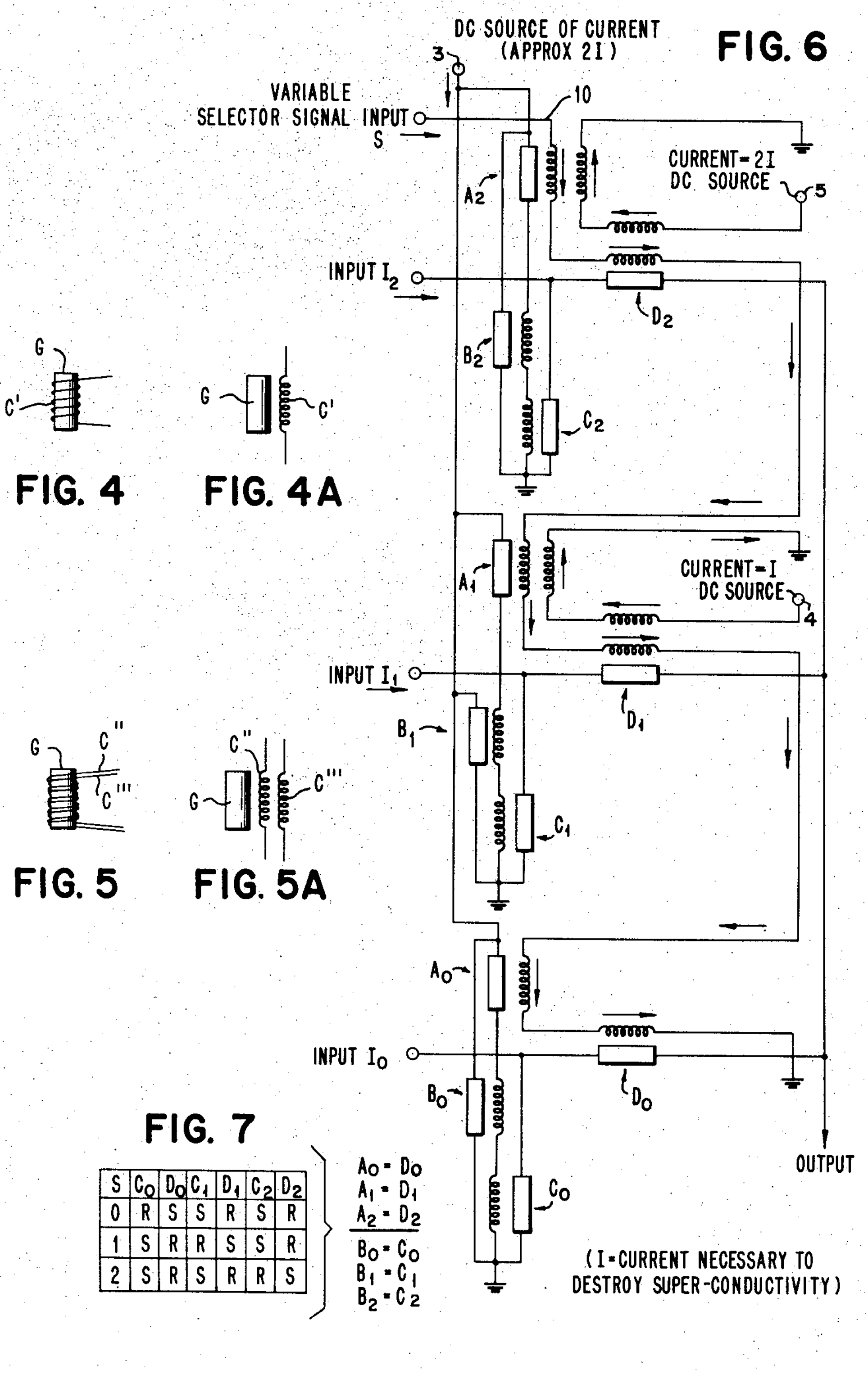
FIGURE 4 shows a wire wound cryotron having a single control coil.
FIGURE 4A is a schematic representation of the cryotron of FIGURE 4.
FIGURE 5 shows a wire wound cryotron having a pair of superimposed control coils.
FIGURE 5A is a schematic representation of the cryotron of FIGURE 5.
FIGURE 6 is a representation of a cryogenic multivalued logic circuit constructed according to the principles of the present invention.
FIGURE 7 is a "truth table" showing the operation of the cryogenic circuit of FIGURE 6.

In accordance with the principles of the present invention, a further embodiment employing cryotron elements is shown in FIGURES 4–6. FIGURE 4 is a diagrammatic representation of a typical cryotron element. The cryotron comprises a gate conductor G of suitable material, such as tantalum about which is wound a control conductor comprising, for example, a single coil C' of niobium metal. Cryotrons as used in the circuits herein shown may be fabricated utilizing a plurality of superimposed control windings each of which, when energized, applies a magnetic field to the gate so that the net field applied to the gate is actually the sum or difference of these individual fields according to whether they are applied in the same or in opposite directions. An arrangement of this type is shown in FIGURE 5. The two superimposed coils embracing gate G are designated C'' and C'''. In operation the gate conductor is maintained at a temperature below that at which it becomes superconductive and its superconductivity may be selectively quenched by energizing its associated control coil or coils so that a magnetic field, in excess of the critical field necessary to cause a transition from the superconductive state to a normal state or resistive state at the particular operating temperature, is applied to the gate.

Referring now to the cyrogenic multivalued logic circuit shown in FIGURE 6, three multivalued inputs $I_0$, $I_1$ and $I_2$ are shown. The "selector signal input" lines can have one of three values of current on it at any time, as for example, zero, one and two units of current. The output line will have on it the value of $I_0$, $I_1$ or $I_2$ as determined by the particular value of current present on the "selector signal" line. Referring again to the drawing there are shown three groups of four cryotrons each, $A_0$, $B_0$, $C_0$, $D_0$; $A_1$, $B_1$, $C_1$, $D_1$; $A_2$, $B_2$, $C_2$, $D_2$; one group being associated with each input $I_0$, $I_1$ and $I_2$. A first D.C. source of current is applied to terminal 3. This current is equal to approximately twice the value of current necessary to quench the superconductivity of any cryotron and is applied to each pair of cryotron gates $A_0$–$B_0$, $A_1$–$B_1$ and $A_2$–$B_2$ in parallel. If a cryotron A is superconductive, the current thus applied flows through the control coils of the corresponding cryotrons B and C. The second control coils of the A and D cryotrons, except $A_0$ and $D_0$, are biased additionally by other external D.C. sources of current applied to terminals 4 and 5. The current applied to terminal 4 is one unit of current, whereas the current applied to terminal 5 is two units of current, only one unit of current being required to keep the gate closed.

In operation inputs $I_0$, $I_1$ and $I_2$ are applied to the circuit and the "selector signal input" S assumes values in accordance with the input to be selected. When the "selector signal input" is zero, cryotrons $D_1$ and $D_2$ will be biased at one and two units of current, respectively, and hence will be resistive, while cryotron $D_0$ will be in a superconductive state. Thereby, only input $I_0$ will appear as the output. Similarly when the "selector signal input" is at one unit of current, cryotron $D_0$ will be held resistive while cryotron $D_1$ is maintained in the superconducting state since the currents in the two windings of cryotron $D_1$ cancel each other. Cryotron $D_2$ however is kept in the resistive state because it has a net current of one unit present on it. Similarly, when S is two units of current only cryotron $D_2$ will be superconductive.

Cryotrons A, B and C provide an alternate superconducting path to dissipate unselected input signals. The first control coil of the A cryotrons receives the current applied from the variable selector signal. The second control coil associated with each A cryotron is biased from the same D.C. source which biases the second coils of the $D_1$ and $D_2$ cryotrons. When D is held in the resistive state, its associated input is prevented from reaching the output information channel. At the same time the A cryotron will also be resistive. In this manner the control conductor of C will not receive any current and its gate will remain in the superconductive state. Hence the unselected inputs will find a superconducting path to ground through C. At the same time, the D.C. current applied in parallel to the A and B cryotrons will find a superconducting path through the gate of cryotron B to ground. Conversely, when D is superconducting, A will be too, thus causing B and C cryotrons to become resistive forcing the input through the D cryotron to the output line. Specifically, when the "selector signal input" is zero, no current flows in the control coil of cryotron $A_0$ and hence $A_0$ is superconducting. Two units of current are thus allowed to flow through $A_0$ from the D.C. source of current applied thereto, which current holds $C_0$ resistive. Current from input $I_0$ is thus forced to flow through superconductive $D_0$. At the same time cryotron $A_1$ is held resistive along with $D_1$. Since $A_1$ is resistive no current flows in the control coils of $B_1$ and $C_1$ and they are maintained superconductive. $C_1$ therefore provides a superconductive path to ground shorting out $D_1$ which is resistive. $D_1$ being resistive, prevents any back currents to the other inputs. At the same time $A_2$ is resistive and $B_2$ and $C_2$ are superconducting. $C_2$ thereupon provides a superconducting path to ground for $I_2$.

The logic element of the present invention may be cascaded in order to select one of many inputs in accordance with the values of multivalued "selector variable signals," FIGURE 8 shows schematically a cascaded function of two-3-valued variables. In this example, one of nine inputs, $f_0, f_1 \ldots f_8$ may be selected by setting appropriate values of two S inputs, $V_0$ and $V_1$. By utilizing two variable signals, each of which may take on merely three values, it is possible to select one of the total of nine inputs. With only one selector function, on the other hand, a selector signal having nine values would be necessary to select one of the same nine inputs. The truth table of FIGURE 8A shows the mode of operation of the cascaded circuit. Similarly, a selector function of three two-valued variables may be constructed as shown in FIGURE 9.

What has been described herein is a generalized method of doing multivalued logic in which a plurality of input information channels are fed through a plurality of energy responsive elements for each of said input channels to generate on a single output information line an output selected from said plurality of inputs by means of a variable energy selection signal applied in common simultaneously on each energy responsive element. The basic circuits of the present invention may be utilized in computer circuitry based upon a logic system having a radix higher than two and as well in conversion of analog information into digital form.

While the invention has been particularly shown and described with reference to preferred embodiments thereof, it will be understood by those skilled in the art that various changes in form and details may be made therein without departing from the spirit and scope of the invention.

What is claimed is:

1. A device capable of establishing in a single logical comparison a logical relationship between a plurality of input channels and an output channel comprising a plurality of energy responsive elements, one associated with each of said input channels, means making said elements uniquely responsive to an applied gating signal having one of a plurality of possible magnitudes equal in number to said input channels, means controlled by said elements for coupling the associated said input channels to said output channel, and means for selectively impressing said gating signal simultaneously on all said energy responsive elements whereby said output channel is coupled with a said input channel in accordance with the magnitude of said gating.

2. A multi-valued logic circuit capable of establishing in a single comparison a logical relationship between a plurality of input channels and an output channel independent of the values of said inputs comprising a plurality of relay coils one associated with each said input channel, means for biasing said coils at predetermined different values of energy whereby said relay coils are uniquely responsive to an applied gating signal having one of a plurality of possible magnitudes equal in number to said input channels, relay point means controlled by said relay coils normally coupling said input channels to said output channel, and means for selectively applying said gating signal simultaneously to all said said relay coils whereby said output channel is coupled with a predetermined said input channel in accordance with the magnitude of said gating signal.

3. The claim according to claim 2 wherein said relay coils are capable of being polarized in one direction by said biasing means and in another direction by said gating signal.

4. A cryogenic multivalued logic circuit capable of establishing in a single operation a logical relationship between a plurality of input information channels and an output information channel comprising a superconductive gate conductor for each of said input information channels coupling each said input channel to said output channel and maintained at an operating temperature below the temperature at which it undergoes a transition from a superconductive to a normal state when a magnetic field is applied thereto, a first control conductor for applying a magnetic field in the vicinity of each said gate conductor, means including a second control conductor for each said gate conductor for individually biasing said gate conductors at predetermined different values of magnetic fields in opposition to aforesaid magnetic fields, and means for applying a signal on said first control conductor selectively variable in accordance with said different predetermined bias values to establish one of said gate conductors in its superconductive state, in accordance with the selected value of said signal.

5. The circuit of claim 4 including means for dissipating input currents to non-selected input channels, last said means comprising sets of second and third and fourth gate conductors, one set associated with each first said gate conductor, means connecting each said second gate conductor in series with control conductors for corresponding said third and fourth gate conductors between ground and a current source equal in magnitude to the largest of aforesaid biasing values, control conductors for each said second gate conductor connected in series with said control conductors for first said gate conductors; means connecting each said third gate conductor in parallel with the associated said second gate conductor and said serially connected control conductors; means connecting each said fourth gate conductor between associated said input lines and ground.

6. In a cascaded selector system comprising a plurality of first energy responsive logic elements each having at least two input channels, a single output channel for each said first logic element, means for connecting said input channels of each said first logic element selectively with associated said output channels in accordance with a gating signal having one of a plurality of possible magnitudes equal in number to the highest number of input channels to a said first logic element, means for applying said gating signal simultaneously to said first logic elements, a second energy responsive logic element having a single output channel, means connecting said output channels of said first logic elements as input channels to said second logic element, means for connecting last said input channels with last said output channel in accordance with a second gating signal having one of a plurality of possible magnitudes equal in number to the input channels to said second logic element, and means for applying said second gating signal.

References Cited in the file of this patent

UNITED STATES PATENTS

| | | |
|---|---|---|
| 2,566,426 | Parks | Sept. 4, 1951 |
| 2,618,706 | Kalfaian et al. | Nov. 18, 1952 |
| 2,733,424 | Chen | Jan. 31, 1956 |
| 2,832,897 | Buck | Apr. 29, 1958 |
| 2,843,839 | Cunningham et al. | July 15, 1958 |
| 2,844,309 | Ayres | July 22, 1958 |
| 2,965,887 | Yostpille | Dec. 20, 1960 |

UNITED STATES PATENT OFFICE

CERTIFICATE OF CORRECTION

July 21, 1964

Patent No. 3,142,037

Midhat J. Gazale

It is hereby certified that error appears in the above numbered patent requiring correction and that the said Letters Patent should read as corrected below.

Column 5, line 5, for "lines" read -- line S --; column 6, line 51, after "gating" insert -- signal --; line 64, strike out "said", second occurrence.

Signed and sealed this 26th day of January 1965.

(SEAL)
Attest:

ERNEST W. SWIDER
Attesting Officer

EDWARD J. BRENNER
Commissioner of Patents